United States Patent
Srinivasan et al.

(10) Patent No.: US 9,590,823 B2
(45) Date of Patent: Mar. 7, 2017

(54) FLOW TO PORT AFFINITY MANAGEMENT FOR LINK AGGREGATION IN A FABRIC SWITCH

(71) Applicant: Oracle International Corporation, Redwood City, CA (US)

(72) Inventors: Arvind Srinivasan, San Jose, CA (US); Stephen Mark Johnson, Santa Rosa, CA (US)

(73) Assignee: Oracle International Corporation, Redwood City, CA (US)

( * ) Notice: Subject to any disclaimer, the term of this patent is extended or adjusted under 35 U.S.C. 154(b) by 210 days.

(21) Appl. No.: 14/490,384

(22) Filed: Sep. 18, 2014

(65) Prior Publication Data
US 2016/0087902 A1  Mar. 24, 2016

(51) Int. Cl.
*H04L 12/46* (2006.01)
*H04L 12/64* (2006.01)
*H04L 12/933* (2013.01)

(52) U.S. Cl.
CPC ...... *H04L 12/4641* (2013.01); *H04L 12/6418* (2013.01); *H04L 49/10* (2013.01)

(58) Field of Classification Search
CPC ...... H04L 47/22; H04L 12/4641; H04L 49/10
See application file for complete search history.

(56) References Cited

U.S. PATENT DOCUMENTS

2011/0026527 A1* 2/2011 Shao ............ H04L 12/4666 370/392

* cited by examiner

*Primary Examiner* — Chi H Pham
*Assistant Examiner* — Kevin Lee
(74) *Attorney, Agent, or Firm* — Polsinelli PC

(57) ABSTRACT

Implementations of the present disclosure involve an apparatus, device, component, and/or method for a hardware efficient flow to port affinity management table for link aggregation for a network fabric switch with Ethernet Gateway functionality. Rather than maintaining a state per traffic flow list, the present disclosure utilizes a handle or hash value derived from the traffic flow and associates an output port state to the hash value. The output port state for the hash value is further associated with a portlist that is based on at least a traffic flow policy of the server or group of servers associated with the traffic flow. In addition, the management table may be adjusted based on state changes to one or more of the output ports such that, if a port becomes unavailable, the management table may be adjusted to account for the unavailability of the port.

18 Claims, 5 Drawing Sheets

FLOW TO PORT AFFINITY MANAGEMENT FOR LINK AGGREGATION IN A FABRIC SWITCH

FIELD OF THE DISCLOSURE

Aspects of the present invention relate to switched fabric computer network devices and, more particularly, aspects of the present invention involve a hardware efficient flow to port affinity management for link aggregation for a network fabric switch with Ethernet Gateway functionality.

BACKGROUND

High performance network fabric switches are utilized in networking environment to provide switching functionality for high performance computing and/or enterprise data centers. One type of such a high performance fabric switch is an Infiniband network fabric switch. For example, an Infiniband fabric switch may provide up to 100 Gigabit per second (Gbps) switching on 42 input/output ports. The fabric switch provides switching capabilities to a network to spread traffic on the network across multiple physical links between the components of the network.

Many such fabric switches include an Ethernet Gateway that connects multiple data center servers over an Ethernet connection. As such, the fabric switch includes high throughput, low latency switch traffic streams and high throughput Ethernet traffic (associated with various virtual machines (VM) of the servers of the data center) carried over the switch communication medium. Thus, traffic through the Ethernet gateway includes virtualized traffic streams to/from various VMs that are part of the data center. However, Ethernet traffic streams may have stringent requirements for traffic isolation and independent policy enforcement. Such policies relate to traffic management, firewall protection schemes, packet processing, and policies associated with link aggregation on the Ethernet ports.

Link aggregation is the combining of multiple network connections in parallel to increase the throughput of the network. By aggregating the links, the throughput of the network is increased by forming a combined link with increased capacity. However, management of the combination of the various traffic streams through the port or ports of the switch can be problematic. For example, the switch typically maintains flow affinity for the selection of physical network ports of the switch for the various traffic streams. But for an Ethernet gateway of a switch connected to multiple data center servers, the possible number of traffic streams through the gateway may be very large. Also, some servers may include link aggregation, while other servers may not as part of an overall policy applied to each server (or virtual local area networks (VLANs) associated with the data center servers). As such, fabric switches with Ethernet gateways often dedicate large areas of hardware components or software processing time to management of the link aggregation of the traffic streams through the Ethernet connection.

It is with these and other issues in mind that various aspects of the present disclosure were developed.

SUMMARY

One implementation of the present disclosure may take the form of a method for operating a switch fabric of a network. The method may include the operation of maintaining a traffic flow table in a switch that provides an indication of Ethernet traffic flows for Ethernet traffic of the switch. In one embodiment, the traffic flow table comprises a plurality of first index values each corresponding to a port list of a plurality of link aggregation policies, each port list comprising a plurality of available output ports of the switch for Ethernet traffic, a plurality of second index values each corresponding to a hash value, each hash value derived from a source indicator in a header of a communication packet received at the switch from the source, and a plurality of output port indicators locatable in the traffic flow table through the plurality of first index values and the plurality of second index values, each output port indicator corresponding to one of the plurality of available output ports of the switch for Ethernet traffic. The method further includes the operations of receiving a first communication packet from a source device connected to the switch and obtaining at least one of the plurality of output port indicators from the traffic flow table based at least on an identifier of the source device and a header of the first communication packet.

Another implementation of the present disclosure may take the form of a network fabric switch. The network fabric switch may comprise an Ethernet gateway input port configured to receive a communication packet from a source device, a plurality of input/output (I/O) ports, each I/O port configured to transmit data packets to a network received from the Ethernet gateway input port and a fabric switch controller. The fabric switch controller is configured to maintain a traffic flow table in the fabric switch that provides an indication of Ethernet traffic flows for Ethernet traffic of the fabric switch and obtain at least one of the plurality of output port indicators from the traffic flow table based at least on an identifier of the source device and a header of the communication packet received from the source device connected to the fabric switch. Further, the traffic flow table comprises a plurality of first index values each corresponding to a port list of a plurality of link aggregation policies, each port list comprising the plurality of I/O ports of the fabric switch for Ethernet traffic, a plurality of second index values each corresponding to a hash value, each hash value derived from a source indicator in a header of the communication packet received at the fabric switch, and a plurality of output port indicators locatable in the traffic flow table through the plurality of first index values and the plurality of second index values, each output port indicator corresponding to one of the plurality of I/O ports of the fabric switch for Ethernet traffic.

DETAILED DESCRIPTION

Implementations of the present disclosure involve an apparatus, device, component, and/or method for a hardware efficient flow to port affinity management for link aggregation for a network fabric switch with Ethernet Gateway functionality. Rather than maintaining a state per traffic flow list, the present disclosure utilizes a handle or hash value derived from the traffic flow and associates an output port state to the hash value. The output port state for the hash value is further associated with a portlist that is based on at least a traffic flow policy of the server or group of servers associated with the traffic flow. Thus, for a given hash value (and/or traffic flow), the output port state is a function of the portlist that is tied to the source of the traffic flow such that the final port number for output of the traffic flow from the switch is a subset of the assigned portlist for that server or servers. This information is stored in a hardware efficient table that reduces the amount of stored information over switches that maintains an output port state per traffic flow list. In one embodiment, the rows of the table are indexed by a port list policy and the columns are indexed based on the hash value of packet headers.

In addition, the management table may be adjusted based on state changes to one or more of the output ports. For example, if a port becomes unavailable, the management table may be adjusted to account for the unavailability of the port. In one embodiment, the changes to the management table may be performed based at least on a policy consideration. Also, such changes may be performed through hardware and/or software components of the switch. In this manner, the switch may maintain the traffic flow related to an Ethernet gateway of the switch that reduces the hardware components dedicated to the maintenance, as well as provide for changes to the traffic flow based on at least one policy decision of the switch.

Figure 1:
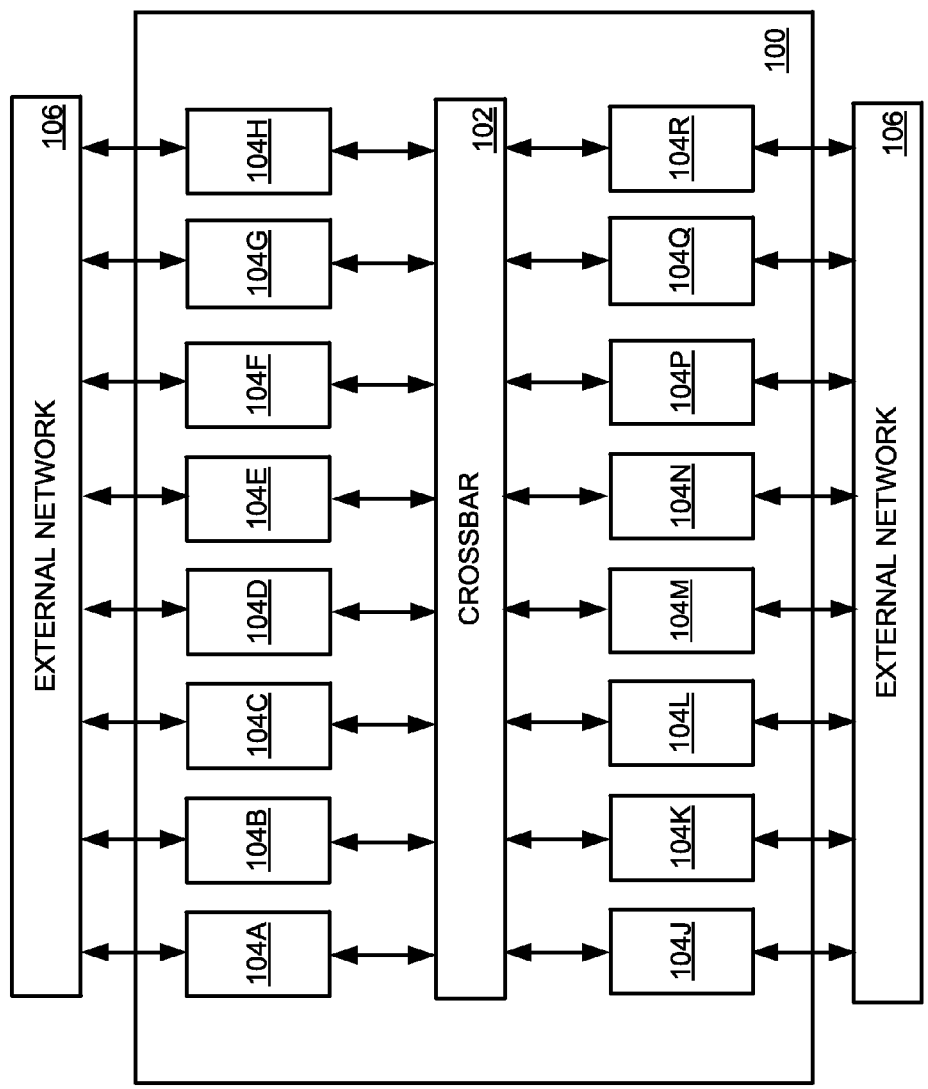
FIG. 1 is a circuit diagram illustrating an example of a network fabric switch with an Ethernet gateway.

FIG. 1 is a circuit diagram illustrating an example of a network fabric switch 100. As described above, a network fabric switch 100 provides switching capabilities in networking environments, such as computing networks and/or enterprise data centers. In particular, the switch 100 may include any number of input/output ports 104A-R that receive data from an external source 106 and/or transmit received data to the external source. The switch 100 illustrated in FIG. 1 includes 16 such ports 104A-R. However, the switch 100 may include any number of I/O ports, such as 42 ports of an Infiniband-type switch. As mentioned, the external sources or network 106 provide data in one or more packets to the switch 100 for transmission to other components in the network. The data is transmitted through the ports 104A-R of the switch. Once a packet is received on one of the ports 104A-R, the packet may then be transmitted across the crossbar 102 of the switch 100 to any other I/O port for transmission out to the network 106. In this manner, data packets are received at the switch 100 from the network 106, transmitted to any other port 104A-R of the switch, and sent out to another portion or component of the network.

In one particular example, the switch 100 is an Infiniband-type fabric switch. In other words, the switch 100 operates on the Infiniband standard for fabric switches. As mentioned above, the switch 100 may include any number of I/O ports 104A-R. In the Infiniband example above, the switch 100 includes 42 such ports and is capable of switching up to 100 Gbps of data rate per port.

In some types of fabric switches, one or more Ethernet gateways may be included. For example, one or more of the I/O ports 104A-R illustrated in FIG. 1 may be an Ethernet-based gateway or port that receives Ethernet-based communications and transmits the Ethernet communications to one or more of the other I/O ports of the switch 100. In one example, the Ethernet-based gateway may be an Infiniband port that can carry Ethernet payload over the port (such as Ethernet over Infiniband traffic (EoIB)). For simplicity, the Ethernet-capable input port is discussed with reference to I/O port 104A herein and the output ports are discussed with reference to I/O ports 104J-104M herein. However, the switch 100 may include any number of Ethernet-capable I/O ports. Also, as explained above, the Ethernet gateway 104A may connect a component or group of components (such as from the external network 106) to other components over an Ethernet connection. In one embodiment utilizing an Infiniband switch, the components on the Infiniband side of the switch may execute virtual machine servers that utilize the Ethernet connection to provide communications to clients on the gateway side of the switch. Thus, traffic through the Ethernet gateway 104A includes virtualized traffic streams to/from various VMs that are connected to the switch 100. Each VM server connected to the Ethernet gateway 104A may be identified with a media access control (MAC) address or virtual local area network (VLAN) address. Such addresses may be utilized by the network 106 to identify the destination and/or source of a communication packet transmitted over the Ethernet gateway 104A. Further, such addresses may be included in a packet header associated and transmitted with the communication packet.

In addition, each VM communicating over the Ethernet gateway 104A may include requirements for traffic isolation and independent policy enforcement. For example, one or more of the VMs communicating over the Ethernet gateway 104A may include link aggregation policy rules that combine more than one communication streams and transmit the streams in parallel. In a link aggregation policy, the traffic transmitted through the Ethernet gateway from a particular source may utilize two or more specific ports as the output ports for the communication. For example, one VM or server (identified by a MAC/VLAN address) may require a link aggregation on two Ethernet network ports, such as output port designated port 0 and output port designated port 1 by the switch 100. In response, the switch 100 may balance traffic from the particular source to be transmitted on port 0 and port 1. Another source VM or server may have a link aggregation policy that allows transmission through any like output port of the switch (such as Ethernet ports), while another policy restricts transmission to a particular output port, thereby having no link aggregation policy at all or a fixed port assignment.

As should be appreciated, the switch 100 maintains an indication of flow to port from each Ethernet traffic source to a particular output port 104J-M. In one embodiment, the switch 100 simply maintains a listing of the output port being utilized by each traffic flow. However, switches connected to multiple data center servers may transmit and maintain a very large number of traffic streams through the gateway such that the listing of the output port being utilized by each traffic flow is similarly very large. If such list is maintained in the hardware of the switch 100, valuable area within the switch is dedicated to maintaining the traffic listing. Further, when a given port's link status changes (such as when the port becomes unoperable), the traffic flow through that port must be rerouted to other output ports of the switch 100 to maintain the flow to port affinity for the switch. For switches that utilize a long list of port flows, this rebalancing of the traffic flow may be processor intensive and time consuming, possibly resulting in lost traffic.

Figure 2:
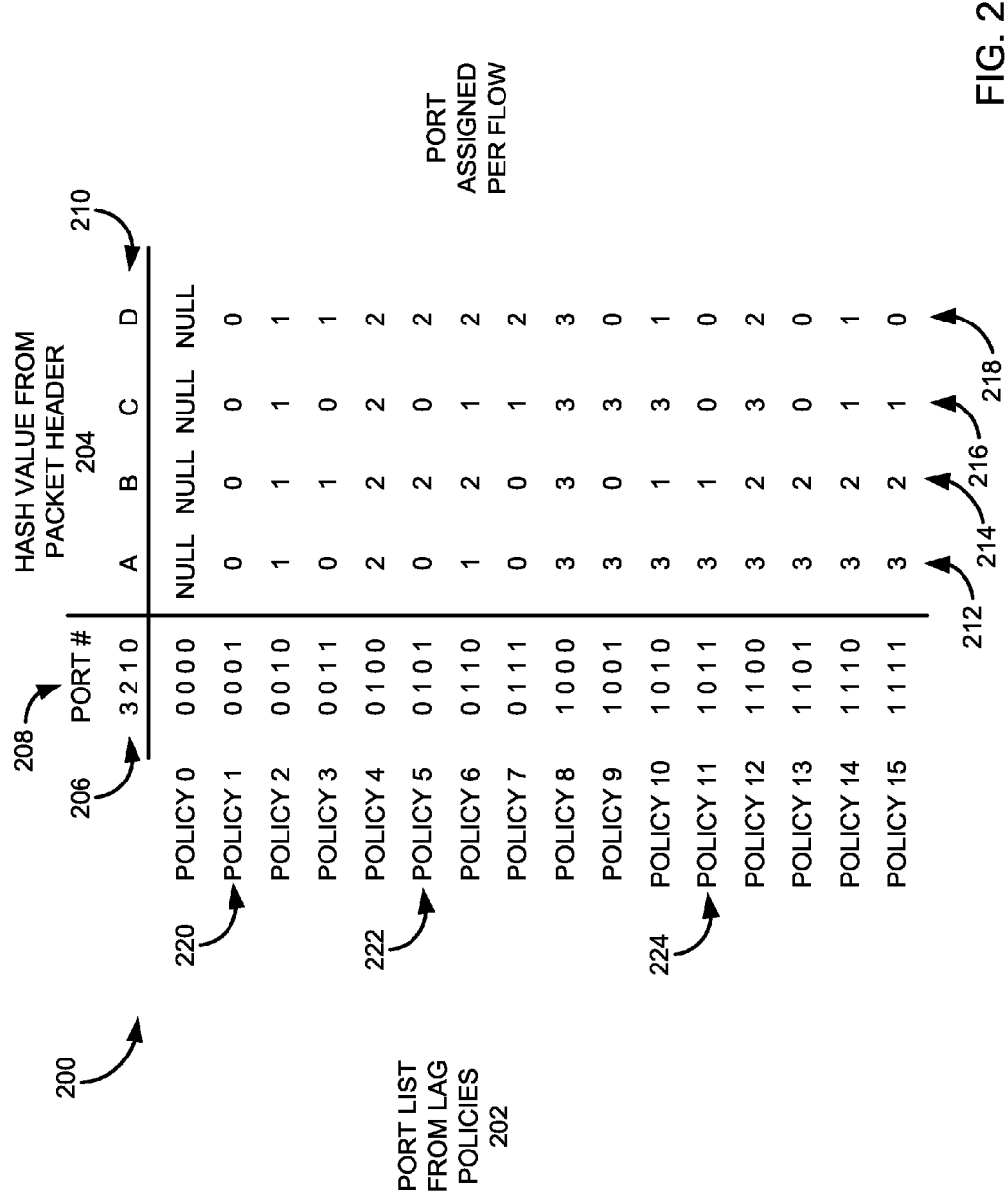
FIG. 2 is a link management table maintained by a network fabric switch for managing aspects of Ethernet-based traffic streams through the switch.

FIG. 2 is a link management table maintained by a network fabric switch for managing aspects of Ethernet-based traffic streams through the switch. In particular, the link management table 200 of FIG. 2 is a representation of a hardware- or software-maintained table that provides a switch with indications of port flows for each Ethernet traffic flow through an Ethernet gateway 104A associated with the switch. The use of the link management table 200 of FIG. 2 utilizes an indication scheme for the entries in the table that requires fewer components when compared to a straight listing of each port flow in the switch. In other words, the use of the link management table 200 consumes fewer switch components 200 and is hardware efficient. Also, the use of the link management table 200 of FIG. 2 by a switch 100 allows the switch to respond to state changes to one or more of the output ports 104J-M quicker and more efficiently than in previous link management schemes. The link management table 200 of FIG. 2 may be maintained by the switch 100 through one or more hardware components, one or more software programs, or a combination of both hardware components and software programs.

The entries in the link management table 200 are indexed by a link aggregation (LAG) policy associated with a source of a communication packet 202 and a hash value 204 obtained from a header of the communication packet. In particular, the rows of the table 200 are indexed by the port list policy 202 and the columns of the table are indexed by the hash value 204. As should be appreciated, the table 200 of FIG. 2 is but one simple example of such a table for a switch with four available Ethernet output ports and four possible hash values. However, the table 200 may include any number of entries corresponding to the Ethernet traffic flow of the switch. For example, the switch may include any number of available Ethernet output ports (resulting in more or fewer rows in the table) and any number of hash values derived from the incoming packet (resulting in more or fewer columns in the table). As such, the table 200 is scalable in response to the number of Ethernet communications handled by the switch.

In the example illustrated in FIG. 2, four Ethernet output ports are available, possibly corresponding to I/O ports 104J-M of the switch 100 of FIG. 1. Each available output port 206 is indexed with a port number (ports 0-3 in the table 200). As such, each possible port policy for Ethernet traffic may be expressed by a four digit binary number. As explained above, different groups of servers or VMs that utilize the Ethernet gateway 104A of a switch 100 may have a policy that dictates which output ports may be used for transmission of the traffic. For example, a particular VM may have a link aggregation policy that allows for transmission of packets from the VM over port 0 and port 1 of the switch 100. Other link aggregation policies may allow for transmission through only one port (a fixed port assignment) or through any of the four available output ports 206. An indication of the link aggregation policy associated with a group of servers or VM may be included with the communication packet received from the servers or VM at the switch 100. In one embodiment, the link aggregation policy is obtained from the routine classification of the incoming packets via a look-up table.

The link aggregation policy may be identified by the switch through a binary number that represents the available ports for a given communication packet. In one example, a low or zero value in the binary policy number represents a port that is not available for the packet and a high or one value in the binary policy number represents an available port. Using the example table 200 of FIG. 2, the policy port list is represented by a four digit binary number (shown in column 208). A first policy (labeled "Policy 0") is binary number "0000", indicating that no output ports are available for the incoming packet. Another policy (labeled "Policy 2") is binary number "0010". This binary number indicates that only output port 1 is available for communication packets from a source associated with Policy 2. Output port 1 is available because the second least significant bit of the binary number is associated with output port 1 and that particular bit is asserted in the binary number. It should be appreciated that any bit of the binary number may be associated with any Ethernet output port 104J-M of the switch 100.

Sources of incoming packets may also utilize link aggregation policies through the binary policy number. For example, Policy 7 of the policy list 208 is binary number "0111". This binary number includes three asserted bits (corresponding to output port 0, output port 1 and output port 2). Thus, communication packets received from a source with a policy corresponding to Policy 7 may be transmitted out of either output port 0, output port 1 or output port 2 such that these ports are aggregated for this source. The binary number of Policy 15 ("1111") indicates that any available output port may be used to transmit the packet. The table 200 thus includes every possible link aggregation policy 208 for a switch with four output ports. In this manner, switches with more or fewer Ethernet output ports may also be represented in the table 200 with more or fewer row entries in the table.

Similarly, the columns 204 of the table 200 may be indexed by a hash value 210 derived from the header of an incoming packet. In particular, the switch 100 may obtain a hash value from the MAC-VLAN address of the source of the packet contained in the header of the incoming packet. In one embodiment shown in FIG. 2, the switch utilizes four hash values derived from the MAC-VLAN address, although any number of hash values may be used in the table. In one embodiment, the hash value 210 of a packet is a random, repeatable value obtained from the MAC-VLAN address contained in the packet header. The four hash values 210 of the table 200 of FIG. 2 are indexed as hash values A-D. Further, each hash value 210 indexes a column 204 of the table 200. For example, hash value A is used by the switch to index column 212, hash value B is used by the switch to index column 214, hash value C is used by the switch to index column 216, and hash value D is used by the switch to index column 218. As explained in more detail below, the incoming packet is analyzed by the switch 100 at the Ethernet gateway 104A, a hash value 210 is obtained from the MAC-VLAN address in the header of the packet, and a column 204 of the table is accessed based on the obtained hash value.

Indexed at each row 202 and column 204 of the table 200 is an output port 104J-M indicator. As shown in FIG. 2, each entry in the table 200 corresponds to an output port designator or number. Although shown as a decimal number in the table 200, each entry in the table may be a binary number. Thus, in the example of four output ports 104J-M, each entry may comprise a two digit binary number representing a particular output port. Tables or switches with more available output ports may include binary numbers with more than two digits. The entries at each row 202 and column 204 correspond to an output port that is utilized by the switch 100 to transmit a particular Ethernet traffic flow. As such, the table 200 provides an indication of the port flow for each traffic flow through the Ethernet gateway 104A of the switch 100. Further, each of the traffic flows is indexed based on the policy port list 202 of the source of the traffic flow and a hash value 204 derived from the MAC-VLAN of the source of the packet. Thus, the entries within the table 200 determine the flow of traffic through the Ethernet gateway 104A and maintain the flow to port affinity of the switch 100.

As mentioned above, the policy associated with a source of a communication packet determines which output ports 104J-M available for Ethernet traffic are available. For example, under Policy 1, only output port 0 (such as output port 104M of the switch 100 of FIG. 1) is available for transmission of traffic. This is reflected in the table at row 220. More particularly, the binary number associated with Policy 1 is "0001" such that the asserted bit in the binary number is associated with output port 0. Each entry in row 220 is an indication that output port 0 should be used, regardless of the obtained hash value 210. As such, the table 200 indicates in row 220 that any packet source that utilizes Policy 1 is transmitted through output port 0 104M, whether the hash value 210 of the communication packet is value A, B, C, or D. In other words, communication packets from a source utilizing Policy 1 have a fixed output port of output port 0 104M. Further, the value stored in each entry of row 220 of the table 200 may be a two-digit binary number. In this example, each entry is binary string "00" corresponding to output port 0 104M.

As also mentioned, some policies allow for link aggregation between more than one output port of the switch 100. For example, under Policy 5, both output port 0 and output port 2 (such as output port 104M and output port 104K of the switch 100 of FIG. 1) are available for transmission of traffic. This is reflected in the table at row 222. More particularly, the binary number associated with Policy 5 is "0101" such that the asserted bits in the binary number are associated with output port 0 and output port 2. As above, each entry in row 222 is an indication that output port 0 or output port 2 should be used. Further, the actual output port used for packets from a source utilizing Policy 5 is based on the hash value 210 obtained from the packet header. For example, packets with hash value A are transmitted through output port 0 (as shown by column 212 of the table 200), while packets with hash value B are transmitted through output port 2 (as shown by column 214 of the table). As such, the table 200 indicates in row 222 that a packet source that utilizes Policy 5 is transmitted through output port 0 104M or output port 2 104K, depending on the hash value 210 derived from the header of the packet. The actual value stored in each entry of row 222 may be a two-digit binary number, namely binary string "00" for output port 0 and binary string "10" for output port 2.

In a similar manner, the entries in the table 200 determine the output port for communication packets for sources that utilize link aggregation policies that include three output ports (such as Policy 7 and Policy 13 of table 200) and policies that include all four available output ports (such as Policy 15). These entries are also indexed based on the hash value derived from the communication packet. Thus, regardless of the type of link aggregation policy utilized by the source of a communication packet, the table 200 includes an entry that determines through which output port 104J-M the packet is transmitted. Further, the table 200 may be maintained by a switch 100 to determine the output port for each Ethernet traffic flow of the switch based on a policy attributed to a source of an incoming packet and a hash value obtained from the packet header. By storing and/or maintaining the table 200, the switch 100 does not store a simple list of each traffic flow being handled by the Ethernet gateway and the assigned output port. Rather, by utilizing an incoming packet source policy and a hash value, the number of entries used to store the traffic flow for the Ethernet gateway is greatly reduced providing for a more efficient traffic flow management scheme for the switch.

In addition, one or more global policies of the switch may be applied to the Ethernet traffic flows through use of the table 200 of FIG. 2. For example, the entries of the table 200 may attempt to balance the traffic to each of the output ports as much as possible. In particular, for those policies that have a link aggregation utilizing two output ports (such as Policy 3, Policy 5, Policy 6, etc.), the entries for in the table 200 for the rows associated with those policies may balance the available output ports among the hash tag values 210. Considering row 222 of Policy 5, output port 0 and output port 2 may be utilized for transmission of communication packets. Thus, in response to a global policy decision, the entries in row 222 may be balanced among the hash values such that half of the entries in the row indicate output port 0 and half indicate output port 2. By balancing the entries among the hash values 210, the switch may attempt to balance the traffic flows between the available output ports.

In a similar manner, a global policy related to link aggregation policies of three output ports (such as Policy 7, Policy 11, Policy 13, etc.) may also be executed through the table 200. In one embodiment, the global policy for the switch in response to a link aggregation policy with three output ports includes assigning one hash value 210 to each of the three available output ports, and assigning the remaining hash value to the lowest remaining output port value. For example, row 224 of the table 200 includes entries for Policy 11, with available output port 0, output port 1 and output port 3. Thus, as shown, the entry for hash value A 212 in row 224 indicates output port 3 is used, the entry for hash value B 214 in row 224 indicates output port 1 is used, and the entry for hash value C 216 in row 224 indicates output port 0 is used. The remaining hash value D 218 is assigned output port 0 based on the global switch policy. It should be appreciated that the global policy may be constructed such that any of the available output ports may be assigned the remaining hash value for such link aggregation policies.

In general, any switch performance metric may be utilized in determining which output ports are assigned in the table 200. As mentioned above, the switch may include a global policy that assigns output ports in a balanced manner. Other policies may assign output ports based on an analysis of the traffic flow for each port and assign traffic flows to the output port with the least amount of traffic flow, assign output ports based on a recordation of the stability of the output port over a period of time, a random assignment of output ports, assignment of output ports based on a list of ranked preferences of output ports, among others.

In addition to reducing the amount of information stored to maintain the traffic flow to port in the switch, the table 200 may also aid the switch in responding to a change of state to an output port of the switch. State changes of an output port of the switch 100 occur when the port malfunctions or any other change to the port that results in the output port being unusable for transmitting packets. In response to such state changes, one or more entries in the table 200 may be altered by the switch to account for the state change of the output ports. Such alteration to the table 200 may be conducted based on one or more global policy rules of the switch, as discussed in more detail below.

Figure 3:
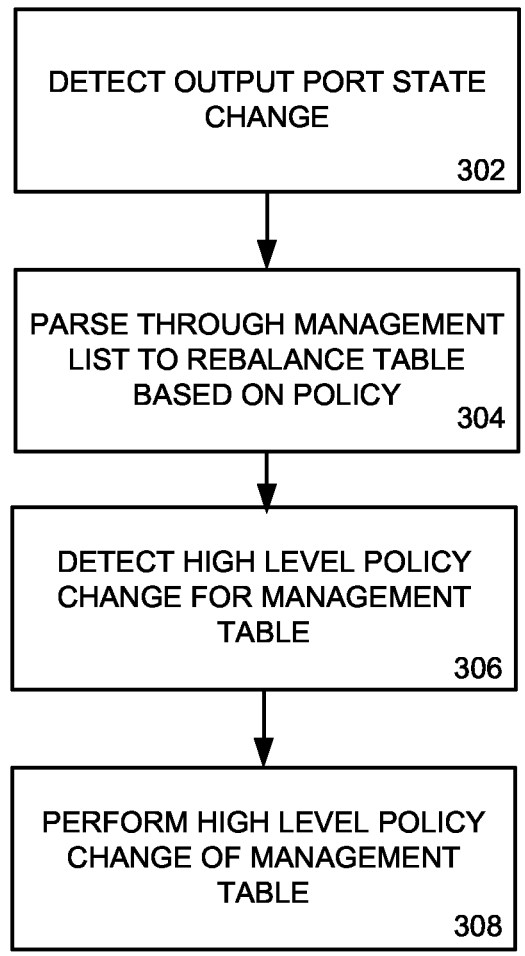
FIG. 3 is a flowchart of a method for maintaining one or more traffic streams through an Ethernet gateway of a fabric switch.

FIG. 3 is a flowchart of a method for maintaining one or more traffic streams through an Ethernet gateway of a fabric switch in response to an output port state change. The operations of FIG. 3 may be performed by the switch 100 in response to the output port state change, such as the unavailability of an output port. Further, the operations may be performed through hardware components of the switch 100, software programs of the switch, or a combination of hardware and software components. Also, some operations may be performed or initiated by a command from a switch administrator or control device.

Beginning in operation 302, the switch detects a state change at an Ethernet output port of the switch. A state change may be detected when the output port becomes unavailable for transmission of Ethernet traffic, such as during failure of the output port or decommissioning of the output port by a switch administrator. In operation 304, the switch parses through the traffic flow management table (such as that shown in FIG. 2) and alters one or more entries of the table in response to the port state change. In general in response to the state change, the switch 100 determines each entry in the table corresponding to the port at which the state change occurs and removes that port from the table 200. In addition, the switch 100 then enters new entries in place of the removed entries based on one or more global policy rules of the switch. The replacement of the entries of the table 200 in response to a port state change is described in greater detail below with reference to the table of FIG. 4.

Figure 4:
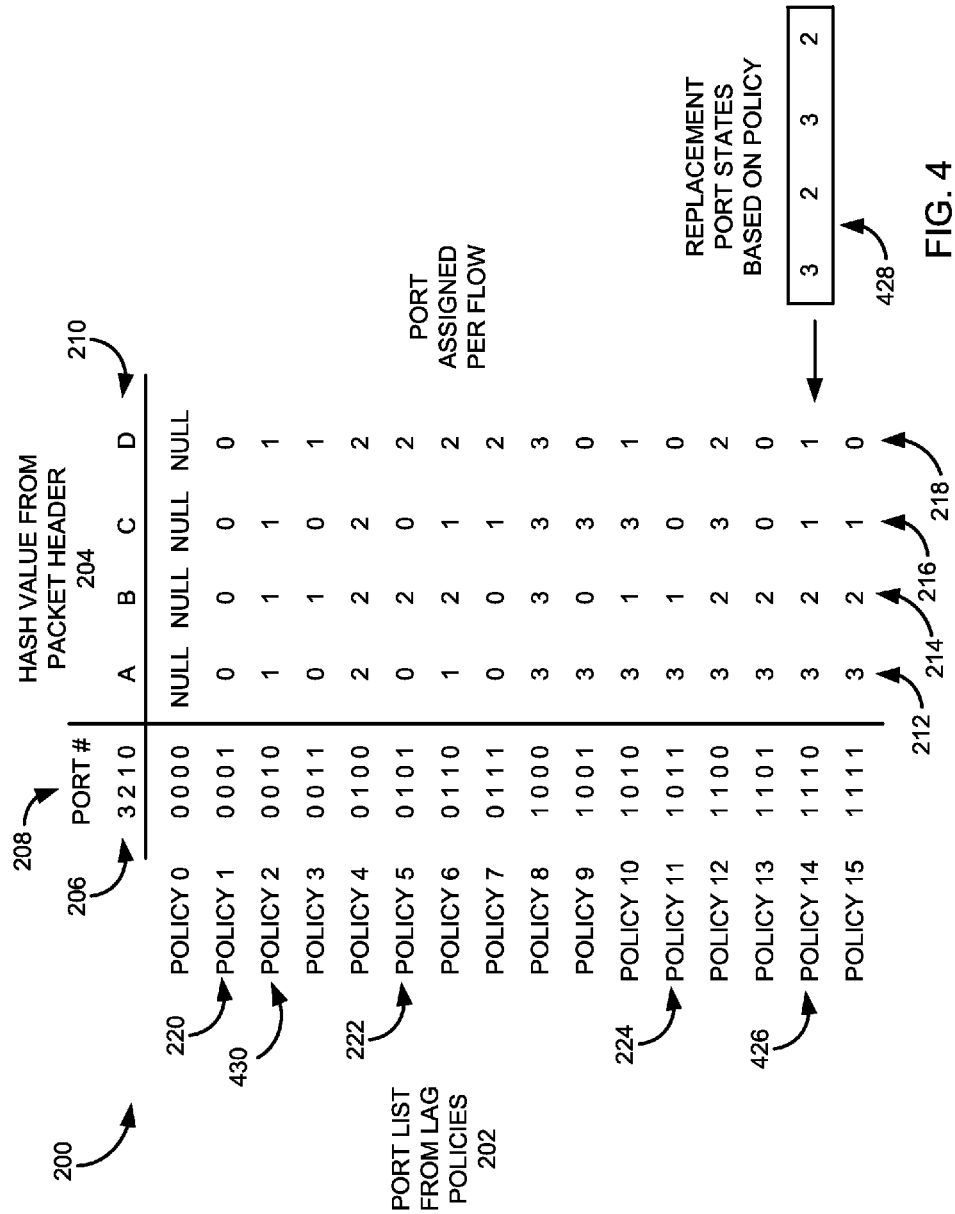
FIG. 4 is a link management table maintained by a network fabric switch for managing aspects of Ethernet-based traffic streams through the switch, including the replacement of entries in the table as states of ports of the switch change.

FIG. 4 is a link management table maintained by a network fabric switch for managing aspects of Ethernet-based traffic streams through the switch, including the replacement of entries in the table as states of ports of the switch change. In general, the table 200 of FIG. 4 is the same table illustrated in FIG. 2 and discussed above. Thus, the table 200 of FIG. 4 includes similar or the same identification numbers for the aspects of the table. However, in this example, a replacement row 428 is illustrated that may be integrated into the table 200 in response to a port state change.

In particular, the replacement row 428 of entries may be integrated into the table 200 in response to a state change at output port 1 of the switch 100. As mentioned, this may occur if output 1 becomes unavailable for transmission of Ethernet traffic. In response to the state change at port 1, one or more entries of the table 200, and in particular, the entries of row 426 of the table may be altered by the switch 100. Because port 1 is no longer available for Ethernet traffic, the entries in row 426 corresponding to port 1 may be changed to available output ports. Further, the replacement values in the entries of row 426 may correspond to the available output ports based on the policy represented in row 426. In particular, the binary number ("1110") associated with the policy (Policy 14) of row 426 indicates that output port 1, output port 2, and output port 3 are available for packets from sources utilizing that link aggregation policy scheme. However, output port 1 is currently unavailable in this example. Thus, output port 2 and output port 3 are the only available output ports for this policy based on the state change of output port 1. During revision of the table 200 based on the output port state change, the entries in row 426 may reflect that only output port 2 and output port 3 are available. This is illustrated in replacement row 428. The switch 100 would then replace the entries in row 426 to remove entries to unavailable output port 1 and replace them with references to available output port 2 (for packets with hash value D 218) and output port 3 (for packets with hash value C 216).

In addition, the values to which the switch alters the entries in the table 200 based on the port state change may occur in regards to a policy rule of the switch. For example, as shown in the replacement row 428 of the table 200, the changed entries may be balanced between the two remaining available ports (port 2 and port 3). In general, the replacement of entries in the table 200 based on a port state change may adhere to any type of policy rule of the switch, such as traffic flows to the output ports, stability of the output ports over a period of time, a random assignment of output ports, etc.

This replacement of entries in the table 200 may also occur for each row in the table that includes an entry for a port with a state change. Continuing the example above, output port 1 may become unavailable to the switch. In response, each entry in the table 200 for output port 1 as the output port for a traffic stream may be altered or changed to a new output port, where possible. For example, the policy associated with row 430 is a dedicated port policy to output port 1. Thus, the entries in row 430 may all be changed to a "NULL" value to indicate that no output port is available for Ethernet traffic from sources that utilize Policy 2. The alteration to the entries in the table 200 may be performed for every row 202 in the table to reflect the change in port state. Other port state changes, such as the unavailability of other output ports or the re-availability of a previously unavailable port, may create similar changes to the entries in the traffic flow management table. In this manner, the switch 100 may respond to state changes in the output port of the switch and maintain the flow to port affinity of the Ethernet gateway of the switch.

In a similar manner, other high level policy changes to the management table may be detected by the switch in operation 306. For example, the switch 100 may receive a policy rule from an administrator or administration program associated with the switch. This high level policy change may establish or alter a global policy rule for the switch 100, such as a policy rule to balance the output ports in rows of the table, a policy rule to favor output ports with the least amount of traffic, a policy rule that establishes an output port preference list, and the like. In general, any of the global policy rules discussed herein may be established or received from an administrator of the switch. In another example, one or more group of servers or VMs may migrate into or out of the list of sources communicating through the Ethernet gateway. In one embodiment, the switch may maintain a link aggregation policy for each source utilizing the gateway. In this embodiment, a high level policy change may include the addition or subtraction of sources utilizing the gateway and the link aggregation policy associated with that source. In this manner, the switch may maintain a source and selected policy for the switch. Changes to such a list may be detected by the switch and initiate a high level policy change within the switch 100.

In operation 308, the switch 100 may perform the high level policy change to the management table based on the high level policy change detected above. In one embodiment, policy changes may be performed by a high level software program of the switch. The software program may apply the high level policy change by altering the global policy rules governing the traffic flow management table 200 or by amending the source/policy list discussed above. In this manner, the switch 100 may also perform high level policy changes to the switch for management of the traffic flow table 200 describe herein.

Figure 5:
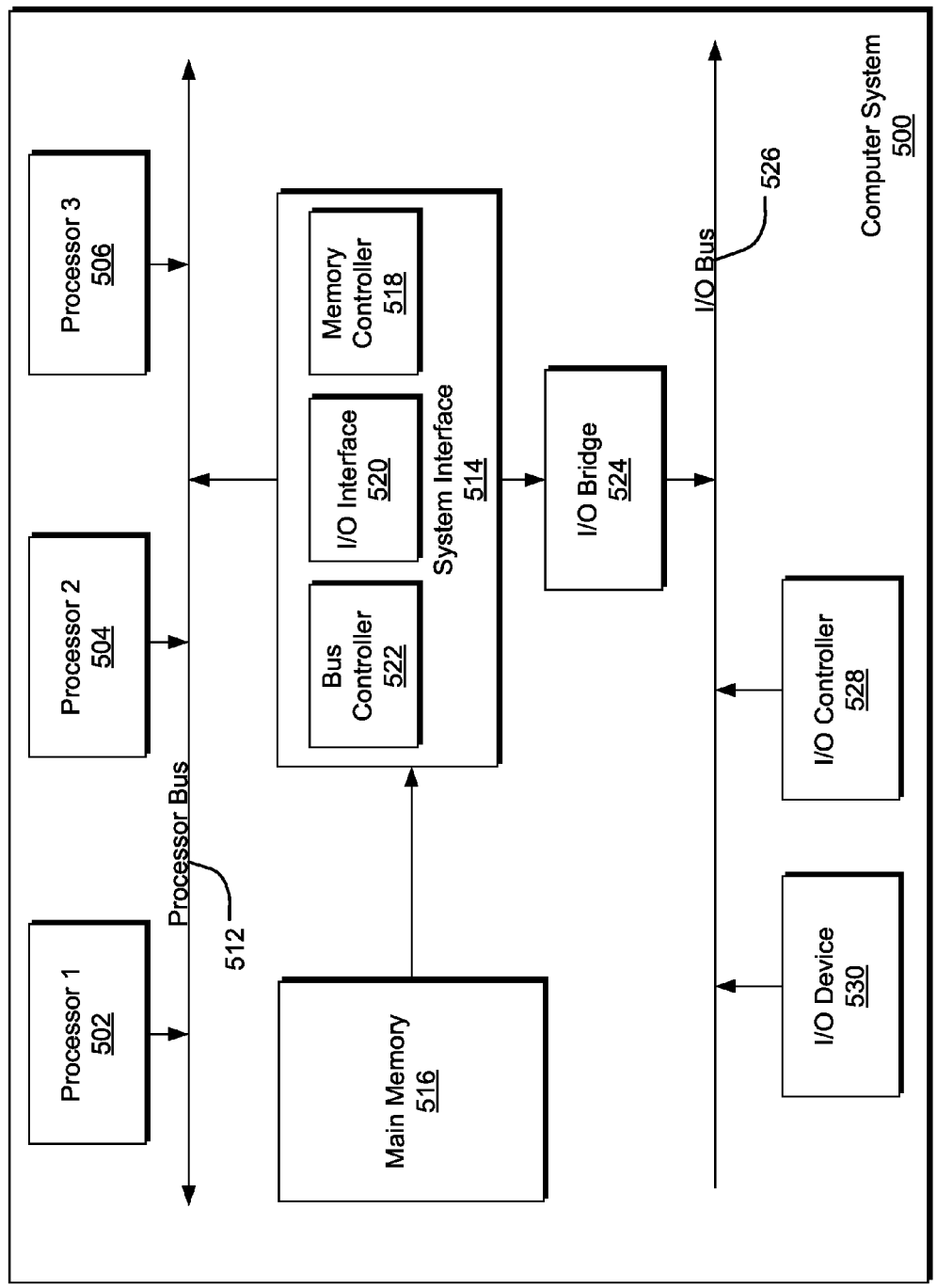
FIG. 5 is a block diagram illustrating an example of a computing system which may be used in implementing embodiments of the present disclosure.

FIG. 5 is a block diagram illustrating an example of a computing device or computer system 500 which may be used in implementing the embodiments of the fabric switch disclosed above. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 518 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 530, as illustrated.

I/O device 530 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

It should be noted that the flowchart of FIG. 3 is illustrative only. Alternative embodiments of the present invention may add operations, omit operations, or change the order of operations without affecting the spirit and scope of the present invention.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A method for operating a switch fabric of a network, the method comprising:
    maintaining a traffic flow table in a switch that provides an indication of Ethernet traffic flows for Ethernet traffic of the switch, the traffic flow table comprising:
        a plurality of first index values each corresponding to a port list of a plurality of link aggregation policies, each port list comprising a plurality of available output ports of the switch for Ethernet traffic;
        a plurality of second index values each corresponding to a hash value, each hash value derived from a source indicator in a header of a communication packet received at the switch from a source; and
        a plurality of output port indicators locatable in the traffic flow table through the plurality of first index values and the plurality of second index values, each output port indicator corresponding to one of the plurality of available output ports of the switch for Ethernet traffic;
    receiving a first communication packet from a source device connected to the switch;
    obtaining at least one of the plurality of output port indicators from the traffic flow table based at least on an identifier of the source device and a header of the first communication packet;
    monitoring a state for each of the plurality of available output ports of the switch for Ethernet traffic; and
    replacing the at least one of the plurality of output port indicators locatable in the traffic flow table upon a state change for a corresponding one of the plurality of available output ports of the switch for Ethernet traffic.

2. The method of claim 1 wherein each of the plurality of first index values comprise a first index binary string representing available output ports of the switch for Ethernet traffic, wherein each asserted bit of the first index binary string corresponds to an available output port of the plurality of available output ports of the switch for Ethernet traffic.

3. The method of claim 2 wherein at least one first index binary string comprises a plurality of asserted bits.

4. The method of claim 1 wherein the source indicator in the header of the communication packet is a media access control (MAC) address of a server device in communication with the switch.

5. The method of claim 1 wherein the source indicator in the header of the communication packet is a virtual local area network (VLAN) address of a virtual machine hosted by a networking device in communication with the switch.

6. The method of claim 1 wherein a state change occurs when a particular output port becomes unavailable for carrying Ethernet traffic.

7. The method of claim 1 wherein replacing the at least one of the plurality of output port indicators locatable in the traffic flow table upon a state change for the corresponding one of the plurality of available output ports of the switch for Ethernet traffic is based at least on a global switch policy for output port state change.

8. The method of claim 1 wherein the traffic flow table is stored in a plurality of logic devices of the switch.

9. The method of claim 1 wherein the traffic flow table is stored as a software program of the switch.

10. A network fabric switch comprising:
an Ethernet gateway input port configured to receive a communication packet from a source device;
a plurality of input/output (I/O) ports, each I/O port configured to transmit data packets to a network received from the Ethernet gateway input port; and
a fabric switch controller, the controller configured to:
maintain a traffic flow table in the fabric switch that provides an indication of Ethernet traffic flows for Ethernet traffic of the fabric switch, the traffic flow table comprising:
a plurality of first index values each corresponding to a port list of a plurality of link aggregation policies, each port list comprising the plurality of I/O ports of the fabric switch for Ethernet traffic;
a plurality of second index values each corresponding to a hash value, each hash value derived from a source indicator in a header of the communication packet received at the fabric switch; and
a plurality of output port indicators locatable in the traffic flow table through the plurality of first index values and the plurality of second index values, each output port indicator corresponding to one of the plurality of I/O ports of the fabric switch for Ethernet traffic;
obtain at least one of the plurality of output port indicators from the traffic flow table based at least on an identifier of the source device and a header of the communication packet received from the source device connected to the fabric switch; and
replace the at least one of the plurality of output port indicators locatable in the traffic flow table upon a state change for a corresponding one of the plurality of I/O ports of the fabric switch for Ethernet traffic.

11. The network fabric switch of claim 10 wherein a state change occurs when a particular output port of the plurality of I/O ports of the fabric switch for Ethernet traffic becomes unavailable for carrying Ethernet traffic.

12. The network fabric switch of claim 10 wherein replacing the at least one of the plurality of output port indicators locatable in the traffic flow table upon a state change for the corresponding one of the plurality of I/O ports of the fabric switch for Ethernet traffic is based at least on a global switch policy for output port state change.

13. The network fabric switch of claim 12 wherein the global switch policy comprises selecting the I/O port of the plurality of I/O ports of the fabric switch for Ethernet traffic with the smallest amount of outgoing traffic.

14. The network fabric switch of claim 12 wherein the global switch policy comprises selecting the I/O port of the plurality of I/O ports of the fabric switch for Ethernet traffic with the fewest number of previous state changes.

15. The network fabric switch of claim 10 wherein the source device is a server and the source indicator in the header of the communication packet is a media access control (MAC) address of the server.

16. The network fabric switch of claim 10 wherein the source device is a server and the source indicator in the header of the communication packet is a virtual local area network (VLAN) address of a virtual machine hosted by the server.

17. The network fabric switch of claim 10 further comprising a plurality of logic devices configured to store the traffic flow table.

18. The network fabric switch of claim 10 further comprising a software program configured to store the traffic flow table.

* * * * *